US012765601B2

(12) United States Patent
Liu et al.

(10) Patent No.: US 12,765,601 B2
(45) Date of Patent: Oct. 20, 2026

(54) AEROSOL-PRODUCING DEVICE

(71) Applicant: SHENZHEN FIRST UNION TECHNOLOGY CO., LTD., Shenzhen (CN)

(72) Inventors: Shenhui Liu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 923 days.

(21) Appl. No.: 17/755,443

(22) PCT Filed: Oct. 30, 2020

(86) PCT No.: PCT/CN2020/125358

§ 371 (c)(1),
(2) Date: Apr. 29, 2022

(87) PCT Pub. No.: WO2021/083344

PCT Pub. Date: May 6, 2021

(65) Prior Publication Data

US 2024/0008544 A1 Jan. 11, 2024

(30) Foreign Application Priority Data

Oct. 31, 2019 (CN) ........................ 201911056471.3

(51) Int. Cl.
*A24F 40/465* (2020.01)
*A24F 40/51* (2020.01)
(Continued)

(52) U.S. Cl.
CPC ............ *A24F 40/465* (2020.01); *A24F 40/51* (2020.01); *A24F 40/57* (2020.01); *H02M 7/4818* (2021.05); *H05B 6/108* (2013.01)

(58) Field of Classification Search
CPC .......... A24F 40/00; A24F 40/20; A24F 40/40; A24F 40/50; A24F 40/465
See application file for complete search history.

(56) References Cited

U.S. PATENT DOCUMENTS

2019/0200677 A1* 7/2019 Chong .................. A61M 15/06
2020/0022412 A1* 1/2020 Abi Aoun ................ G01K 7/16
2021/0145071 A1* 5/2021 Butin ...................... A24F 40/50

FOREIGN PATENT DOCUMENTS

CN 203563223 U 4/2014
CN 104382238 A 3/2015
(Continued)

*Primary Examiner* — Alex B Efta
(74) *Attorney, Agent, or Firm* — Proi Intellectual Property US

(57) ABSTRACT

An electromagnetic induction heating-type aerosol-producing device and a control method are used to heat a smokeable material produce an aerosol. The device comprises: an LC oscillator, an inductance coil of which is inductively coupled with a susceptor; a power supply for providing a pulse voltage to the LC oscillator; the susceptor, which is penetrated by a changing magnetic field to generate heat, thereby heating the smokable material; and a frequency detection module for detecting the oscillation frequency of the LC oscillator; and according to the detection result of the frequency detection module, a controller adjusts the frequency of the pulse voltage provided by the power supply to the LC oscillator. The oscillation frequency of the LC oscillator is detected in real time, and the frequency of the power supplied to the LC oscillator is constantly corrected according to the detection results.

19 Claims, 5 Drawing Sheets

(51) Int. Cl.

| | |
|---|---|
| ***A24F 40/57*** | (2020.01) |
| ***H02M 7/48*** | (2007.01) |
| ***H05B 6/10*** | (2006.01) |

(56) References Cited

FOREIGN PATENT DOCUMENTS

| | | | |
|---|---|---|---|
| CN | 204599333 | U | 9/2015 |
| CN | 105992528 | A | 10/2016 |
| CN | 106304449 | A | 1/2017 |
| CN | 108224784 | A | 6/2018 |
| CN | 110101117 | A | 8/2019 |
| WO | 2018178114 | A2 | 10/2018 |
| WO | 2019122097 | A1 | 6/2019 |

* cited by examiner

AEROSOL-PRODUCING DEVICE

CROSS REFERENCE TO RELATED APPLICATION(S)

This application claims priority to Chinese Patent Application No. 201911056471.3, entitled "Aerosol-producing device and control method" and submitted to China National Intellectual Property Administration on Oct. 31, 2019, the entire contents of which are incorporated herein by reference.

TECHNICAL FIELD

The present disclosure relates to the technical field of heating and nonburning smoking sets, and in particular to an aerosol-producing device and a control method.

BACKGROUND

Tobacco products (e.g., cigarettes, cigars, etc.) are burning tobaccos to produce tobacco smoke during use. People attempt to make products that release compounds without burning so as to replace the tobacco products burning tobaccos.

An example of this kind of products is a heating device, which heats rather than burns a material to release compounds, for example, the material may be a tobacco product or other non-tobacco products which may contain or not contain nicotine.

In an embodiment of the above heating device of the existing technology, the patent application No. 201580007754.2 discloses an induction heating device for heating special tobacco products by electromagnetic induction, which employs a DC/AC inverter to convert the DC output from a power supply into an AC to supply to the inductance coil; specifically, it forms the AC through an LC oscillator composed of an inductance coil and a capacitor, so that the coil generates an alternating magnetic field to induce a susceptor to generate heat to heat a cigarette. For the induction heating device in the above embodiment of the existing technology, there is a difference between the frequency of the DC/AC inverter and the oscillation frequency of the LC oscillator composed of the inductance coil and the capacitor, resulting in a large loss of power in the condition of driving at a non-resonance frequency.

SUMMARY

In order to solve the problem in the prior art that the difference in frequency between the inverter output and the LC oscillator of the induction heating device causes loss, the embodiment of the present disclosure provides an aerosol-producing device which can adaptively adjust the driving frequency to reduce loss.

One embodiment of the present disclosure provides an aerosol-producing device, configured to heat a smokable material to generate an aerosol, including:

a chamber, which is configured to receive at least part of a smokable material;

an LC oscillator, which includes a first capacitor and an inductance coil in series connection;

a power supply, which is configured to provide a pulse voltage to the LC oscillator so that the inductance coil of LC oscillator generates a changing magnetic field;

a susceptor, which is configured to be penetrated by the changing magnetic field to generate heat, thereby heating the smokable material received in the chamber;

a frequency detection module, which is configured to detect an oscillation frequency of the LC oscillator; and a controller, which is configured to adjust the frequency of the pulse voltage provided by the power supply to the LC oscillator, according to a detection result of the frequency detection module.

In a preferred embodiment, the controller adjusts the frequency of the pulse voltage provided by the power supply to the LC oscillator to be the same as or basically close to the oscillation frequency of the LC oscillator detected by the frequency detection module.

In one embodiment, the frequency of the pulse voltage provided by the power supply to the LC oscillator is ranged from 80 KHz to 400 KHz, more preferably, from 200 KHz to 300 KHz.

In one embodiment, the oscillation frequency of the LC oscillator is ranged from to 400 KHz, more preferably, from 200 KHz to 300 KHz.

In a preferred embodiment, the frequency detection module is configured to detect the oscillation frequency of the LC oscillator by monitoring a change of voltage or current of the LC oscillator.

In a preferred embodiment, the frequency detection module includes:

a voltage detection unit, which is configured to detect a voltage value at a detectable position of the LC oscillator; wherein the frequency detection module detects the oscillation frequency of the LC oscillator according to a change cycle of the detected voltage value.

In a preferred embodiment, the frequency detection module is configured to detect the oscillation frequency of the LC oscillator according to a time difference between two changes of a voltage value at a detectable position to a threshold.

In a preferred embodiment, the threshold is 0V;

and/or, the voltage detection unit includes a zero crossing comparator.

In a preferred embodiment, the frequency detection module includes:

a rectifier diode D, whose input end is connected to a detectable position of the LC oscillator; wherein the frequency detection module further includes a current detection unit which is configured to detect a current at an output end of the rectifier diode, and the frequency detection module deduces the oscillation frequency of the LC oscillator according to a detection result of the current detection unit.

In a preferred embodiment, the current detection unit includes:

a first divider resistor, a second divider resistor and a second capacitor; wherein a first end of the first divider resistor is connected to the output end of the rectifier diode;

a first end of the second divider resistor is connected to a second end of the first divider resistor, and a second end of the second divider resistor is grounded; and the second capacitor is in parallel connection with the second divider resistor; wherein the current detection unit is configured to detect the current at the output end of the rectifier diode according to the voltage at two ends of the first divider resistor or the second divider resistor.

In a preferred embodiment, the frequency detection module is configured to detect the oscillation frequency of the LC oscillator by monitoring a change of the magnetic field generated by the inductance coil in the LC oscillator.

In a preferred embodiment, the frequency detection module includes a Hall sensor which is configured to sense the magnetic field generated by the inductance coil.

In a preferred embodiment, the aerosol-producing device further includes:

a pulse generator, which is configured to generate a pulse signal; wherein the power supply is configured to provide a pulse voltage to the LC oscillator according to a frequency the same as that of the pulse signal;

the controller is configured to control the frequency of the pulse signal generated by the pulse generator, according to a detection result of the frequency detection module, thereby adjusting the frequency of the pulse voltage provided by the power supply to the LC oscillator.

In a preferred embodiment, the pulse generator is configured to generate the pulse signal through Pulse Frequency Modulation (PFM).

In a preferred embodiment, the power supply includes a Direct Current (DC) battery cell which is configured to provide a DC voltage;

In a preferred embodiment, the aerosol-producing device further includes:

a transistor switch which is configured to allow the DC battery cell to provide voltage to the LC oscillator, wherein the controller adjusts the frequency of the pulse voltage provided by the DC battery cell to the LC oscillator by controlling the frequency of turn-on or turn-off of the transistor switch.

In a preferred embodiment, the transistor switch includes a first transistor and a second transistor; the first transistor and the second transistor are configured to be switched alternately to provide a pulse voltage to the LC oscillator, thereby adjusting the frequency of a forward process and a reverse process of the LC oscillator; wherein the forward process includes charging the capacitor and forming a forward current passing through the inductance coil; and the reverse process includes discharging the capacitor and forming a reverse current passing through the inductance coil.

In a preferred embodiment, the first transistor and the second transistor are configured to be switched when the voltage of the LC oscillator changes to 0V.

In a preferred embodiment, the transistor switch includes a first switch group and a second switch group which are configured to turn on alternately according to a frequency the same as that of the pulse voltage; wherein the first switch group includes a first transistor and a second transistor;

the second switch group includes a third transistor and a fourth transistor;

a first end of the first transistor is connected to a voltage output end of the DC battery cell, and a second end of the first transistor is connected to a first end of the LC oscillator;

a first end of the second transistor is connected to a second end of the LC oscillator, and a second end of the second transistor is grounded;

a first end of the third transistor is connected to the voltage output end of the DC battery cell, and a second end of the third transistor is connected to the second end of the LC oscillator; and a first end of the fourth transistor is connected to the first end of the LC oscillator, and a second end of the fourth transistor is grounded.

In a preferred embodiment, the power supply includes a Direct Current (DC) battery cell which is configured to provide a DC voltage;

the aerosol-producing device further includes:

a transistor switch which is configured to allow the DC battery cell to provide voltage to the LC oscillator; and a transistor switch driver, which is configured to control the transistor switch to turn on according to a frequency the same as that of the pulse signal.

In a preferred embodiment, the supply voltage provided by the DC battery cell is ranged from 2.5V to 9.0V;

and/or, the amperage of the supply current provided by the DC battery cell is ranged from 2.5 A to 20 A.

In one embodiment, another aerosol-producing device is further provided, configured to heat a smokable material including a susceptor to generate an aerosol, including:

a chamber, which is configured to receive at least part of a smokable material;

an LC oscillator, which includes a first capacitor and an inductance coil in series connection, wherein when at least part of the smokable material is received in the chamber, the inductance coil is inductively coupled with the susceptor of the smokable material;

a power supply, which is configured to provide a pulse voltage to the LC oscillator so that the inductance coil of LC oscillator generates a changing magnetic field;

a frequency detection module, which is configured to detect an oscillation frequency of the LC oscillator; and a controller, which is configured to control the frequency of the pulse voltage provided by the power supply to the LC oscillator, according to a detection result of the frequency detection module.

In one embodiment, a method for operating the above aerosol-producing device is further provided, including the following steps:

when at least part of the smokable material is received in the aerosol-producing device, providing, by the power supply, a pulse voltage to the LC oscillator, so that the susceptor generates heat; and detecting an oscillation frequency of the LC oscillator, and adjusting the frequency of the pulse voltage provided by the power supply to the LC oscillator, according to the detection result.

With the aerosol-producing device provided in the above embodiments, the oscillation frequency of the LC oscillator is detected in real time, and the frequency of the power supplied to the LC oscillator is constantly corrected, so that the matching of the frequency is constantly adjusted to adaptively adjust the driving frequency to make the two as close to resonance as possible, thereby reducing power loss.

In one embodiment, an aerosol-producing device is further provided, configured to heat a smokable material including a susceptor to generate an aerosol, including:

a chamber, which is configured to receive at least part of a smokable material;

an inductance coil, which, when at least part of the smokable material is received in the chamber, is configured to be inductively coupled with the susceptor; and a power supply, which is configured to provide to the inductance coil an alternating current with frequency ranged from 80 KHz to 400 KHz.

In a preferred embodiment, the power supply is configured to provide to the inductance coil an alternating current with frequency ranged from 200 KHz to 300 KHz.

In a preferred embodiment, the aerosol-producing device further includes:

a capacitor, which is in series connection with the inductance coil to form an LC oscillator;

the power supply includes:

a DC battery cell, which is configured to provide a pulse voltage of the frequency to the LC oscillator so that he LC oscillator oscillates, thereby forming the alternating current.

In a preferred embodiment, the aerosol-producing device further includes: a transistor switch which is configured to allow the DC battery cell to provide voltage to the LC oscillator, wherein the transistor switch is configured to turn on according to the frequency, thereby forming the pulse voltage provided to the LC oscillator.

In a preferred embodiment, the transistor switch includes a first transistor and a second transistor, wherein a first end of the first transistor is connected to a voltage output end of the DC battery cell, and a second end of the first transistor is connected to a first end of the LC oscillator;

a first end of the second transistor is connected to a second end of the LC oscillator, and a second end of the second transistor is grounded; and the first transistor Q1 and the second transistor Q2 are configured to turn on alternately according to the frequency.

In a preferred embodiment, the transistor switch includes a first switch group and a second switch group which are configured to turn on alternately according to the frequency, wherein the first switch group includes a first transistor and a second transistor;

the second switch group includes a third transistor and a fourth transistor;

a first end of the first transistor is connected to a voltage output end of the DC battery cell, and a second end of the first transistor is connected to a first end of the LC oscillator;

a first end of the second transistor is connected to a second end of the LC oscillator, and a second end of the second transistor is grounded;

a first end of the third transistor is connected to the voltage output end of the DC battery cell, and a second end of the third transistor is connected to the second end of the LC oscillator; and a first end of the fourth transistor is connected to the first end of the LC oscillator, and a second end of the fourth transistor is grounded.

In a preferred embodiment, the aerosol-producing device further includes:

a transistor switch driver, which is configured to control the transistor switch to turn on according to the frequency.

In a preferred embodiment, the aerosol-producing device further includes:

a temperature sensor, which is configured to sense a temperature of the susceptor.

The controller is further configured to interrupt the alternating current provided by the power supply to the inductance coil when the temperature of the susceptor is equal to or greater than a predetermined temperature threshold, and to resume the alternating current provided by the power supply to the inductance coil when the temperature of the susceptor is again lower than a predetermined temperature threshold.

In one embodiment, an aerosol-producing device is further provided, configured to heat a smokable material to generate an aerosol, including a chamber, which is configured to receive at least part of a smokable material;

an inductance coil L, which is configured to generate a changing magnetic field under the supply of an alternating current;

a power supply, which is configured to provide to the inductance coil an alternating current with frequency ranged from 80 KHz to 400 KHz.

a susceptor, which extends at least in part in the chamber and is configured to be penetrated by the changing magnetic field to generate heat, thereby heating the smokable material received in the chamber.

With the aerosol-producing device provided in the above embodiments, the alternating current of the selected frequency range is supplied to the inductance coil, to reduce the loss of power within the optional range.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form restrictions unless otherwise stated.

DETAILED DESCRIPTION

For a better understanding, the present disclosure is described below in further detail in conjunction with accompanying drawings and specific embodiments.

Figure 1:
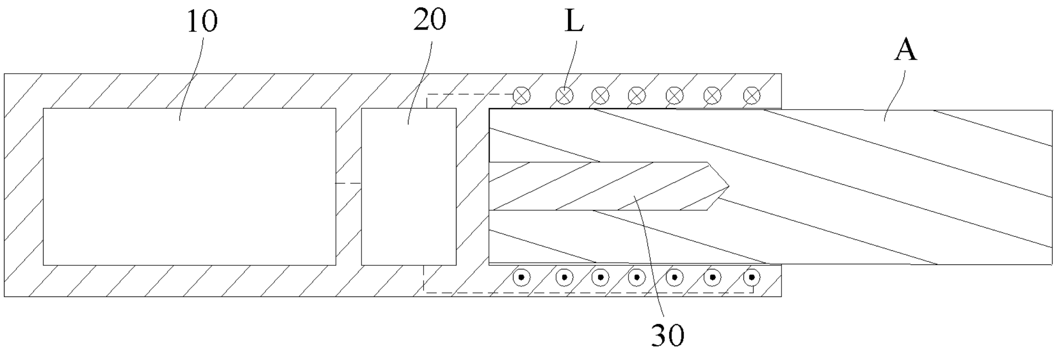
FIG. 1 is a diagram of an aerosol-producing device according to one embodiment.

One embodiment of the present disclosure provides an aerosol-producing device, whose structure can refer to FIG. 1, including:

- a chamber, in which a smokable material A is removably received;
- an inductance coil L, which is configured to generate a changing magnetic field under an alternating current;
- a susceptor 30, which is configured to be inductively coupled with the inductance coil L and to generate heat while being penetrated by the changing magnetic field, thereby heating the smokable material A, for example, cigarette, so that at least one composition of the smokable material A vaporizes to form an aerosol for inhalation;
- a battery cell 10, which is a rechargeable Direct Current (DC) battery cell;
- a circuit 20, which is electrically connected to the rechargeable battery cell 10 and converts the DC output from the battery cell 10 into an Alternating Current (AC) with an appropriate frequency and then supplies it to the inductance coil L.

According to the usage setting of products, the inductance coil L may include a cylindrical inductor coil wound in a spiral shape, as shown in FIG. 1. The cylindrical inductance coil L wound in a spiral shape may have a radius ranged from about 5 mm to about 10 mm, in particular, the radius r may be about 7 mm. The cylindrical inductance coil L wound in a spiral shape may have a length ranged from about 8 mm to about 14 mm, and the inductance coil L has a number of windings ranged from about 8 windings to 15 windings. Correspondingly, the internal volume may be ranged from about 0.15 cm 3 to about 1.10 cm 3.

Figure 13:
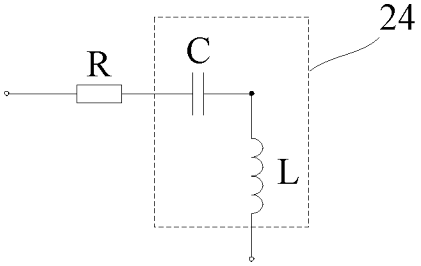
FIG. 13 is a diagram of an oscillator according to another embodiment.

In a preferred embodiment, the circuit 20 may further include a resistor R in series connection with the LC oscillator 24 to form an LCR damped oscillator shown in FIG. 13, thereby being able to improve the Q (quality) factor of the LC oscillator 24 and reduce the loss of power within the optional range.

In order to enable the oscillation frequency of the LC oscillator 24 and the frequency of the alternating current to have a lower loss of power as far as possible and to enable the LC oscillator 24 to be close to resonance, in one embodiment, the frequency of an alternating current output by a DC/AC conversion module 21 and/or the oscillation frequency of the LC oscillator 24 are controlled to be within 80 KHz to 400 KHz during implementation; more specifically, the frequency may be ranged from about 200 KHz to about 300 KHz.

During implementation, the oscillation frequency of the LC oscillator 24 refers to the frequency during an oscillation state, which could be affected by other parameters of the circuit 20, even be interfered by a varying signal; during implementation, through the above approaches, it is simply required that the frequency of the alternating current output by the DC/AC conversion module 21 is finally the same as or basically close to the oscillation frequency of the LC oscillator 24, without requiring the actual oscillation frequency to be consistent with the inherent oscillation frequency of the LC oscillator 24.

In a preferred embodiment, the DC supply voltage provided by the battery cell 10 is ranged from about 2.5V to about 9.0V, and the amperage of the DC provided by the battery cell 10 is ranged from about 2.5 A to about 20 A.

In a preferred embodiment, the susceptor 30 may have a length of about 12 mm, a width of about 4 mm and a thickness of about 50 um, and can be made of Grade 430 stainless steel (SS430). As an alternative embodiment, the susceptor 30 may have a length of about 12 mm, a width of about 5 mm and a thickness of about 50 μm, and can be made of Grade 430 stainless steel (SS430). In another preferred embodiment, the susceptor **30*a* can also be constructed as a cylindrical shape. During usage, the internal space is used for receiving the smokable material A and heating the periphery of the smokable material A to generate an aerosol for inhalation. These susceptors 30** can also be made of Grade 420 stainless steel (SS420) and alloy materials containing iron and nickel (for example, permalloy).

In another preferred embodiment, to ensure the temperature of the susceptor 30 to be kept within a proper heating range of temperature, the aerosol-producing device further includes a temperature sensor (not shown in figures), which is configured to detect a temperature of the susceptor 30; an MCU controller 22 is further configured to interrupt the power generating an alternating current through the DC/AC conversion module 21 when determining that the temperature of the susceptor 30 is equal to or greater than a predetermined temperature threshold, and to resume the power generating an alternating current through the DC/AC conversion module 21 when the temperature of the susceptor 30 is again lower than a predetermined temperature threshold. Of course, the power transmission to the susceptor 30 can also be optimized by controlling the frequency of switching voltage.

Figure 14:
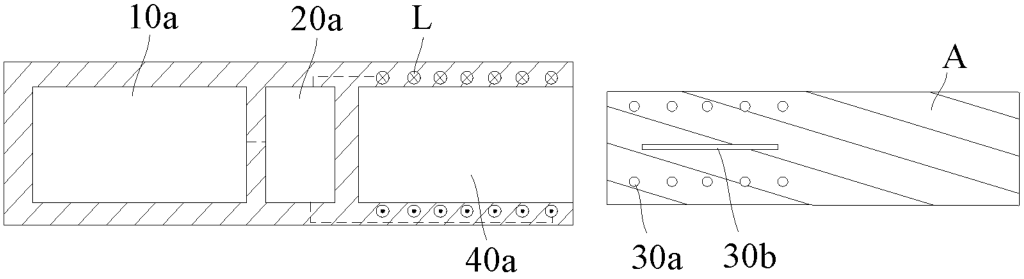
FIG. 14 is a diagram of an aerosol-producing device according to another embodiment.

Another embodiment of the present disclosure provides an aerosol-producing device, whose structure is as shown in FIG. 14, including:

- a chamber **40*a***, in which a smokable material A is removably received;
- an inductance coil L, which is configured to generate a changing magnetic field under an alternating current;
- a battery cell **10*a***, which is a rechargeable Direct Current (DC) battery cell and can output a DC current;
- a circuit 20, which is electrically connected to the rechargeable battery cell 10 and converts the DC output from the battery cell 10 into an Alternating Current (AC) with an appropriate frequency and then supplies it to the inductance coil L.

When the smokable material A used together with the aerosol-producing device is being prepared, its interior is built with or doped with a susceptor member **30*a*/30*b*. During implementation, the susceptor 30*a* may present particles 30*a* evenly distributed inside the smokable material A or present a needle or pin or sheet shape 30*b* extending along an axial direction of the smokable material A. In the present embodiment, the aerosol-producing device itself does not include a susceptor that is electromagnetically coupled with the inductance coil L to generate heat, and the susceptor member 30*a*/30*b* is arranged inside the smokable material A. When the smokable material A is received inside the chamber 40*a*, the susceptor member 30*a*/30*b*** is penetrated by the alternating magnetic field generated by the inductance coil L to generated heat, thereby heating the smokable material A to generate an aerosol for inhalation.

Figure 2:
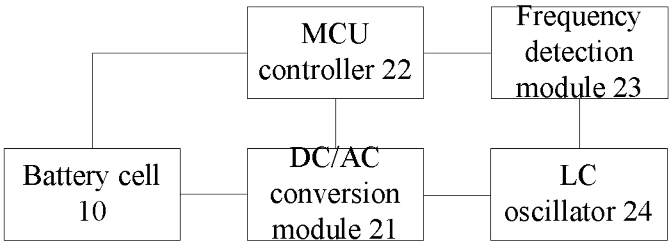
FIG. 2 is a block diagram of a circuit of one embodiment of the aerosol-producing device shown in FIG. 1.
Figure 3:
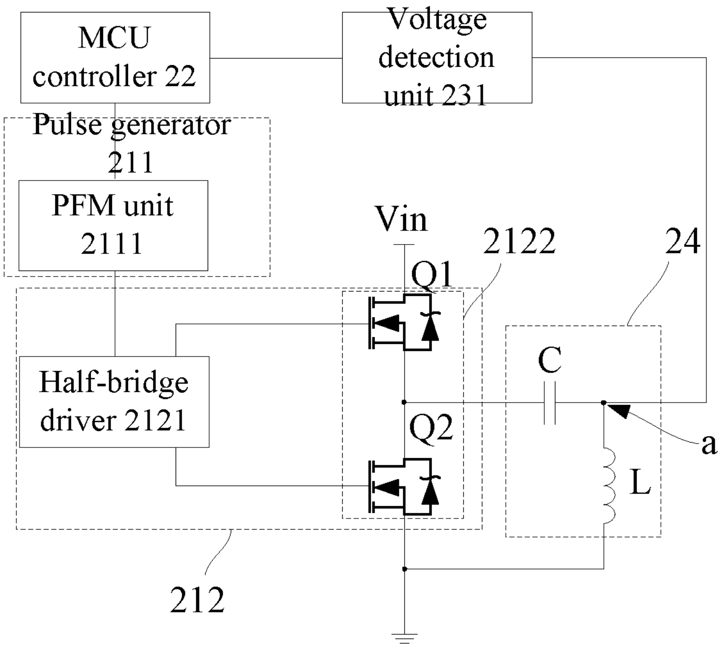
FIG. 3 illustrates one embodiment of a basic element of the circuit shown in FIG. 2.

In order to enable the inductance coil L to operate under a determined proper selected frequency, the circuit 20 in one preferred embodiment can refer to FIG. 2 to FIG. 3 for its structure and basic element, including:

- a DC/AC conversion module 21, which is configured to convert a DC current drawn from the battery cell 10 into an alternating current with a proper frequency and then supplies to the inductance coil L; specifically, during implementation, the DC/AC conversion module 21 includes:

a capacitor C, which is in series connection with the inductance coil L to form an LC oscillator 24 and generates a sine or cosine alternating current through LC oscillation to supply to the inductance coil L.

During usage, the inherent resonance frequency of the LC oscillator 24 will change with the temperature of the susceptor 30; specifically, according to the calculation formula, the resonance frequency of the LC oscillator 24 is $f=1/2\pi(L_lC)^{1/2}$, where $L_l$ represents an inductance value of an iron core coil composed of the susceptor 30 and the inductance coil L, and C represents a capacitance value of the capacitor C. For a given electronic device, the capacitance value basically keeps constant, thus the frequency f basically depends on the change of Li.

The calculation formula for the inductance of the iron core coil is:

$L_l=L+L_s$, where L is the inductance value of the inductance coil L, L s is the real-time inductance of the susceptor 30 serving as the iron core during the working state; during implementation, the inductance value of the inductance coil L basically keeps constant, while the real-time inductance L s of the susceptor 30 is varying.

Further, according to foundations of physics, the calculation of the real-time inductance L s mainly depends on physical parameters including the air-gap length between the susceptor 30 and the inductance coil L (which could generate leakage inductance), the number of windings of the coil, the length of magnetic circuit, the sectional area of the susceptor 30 serving as the iron core, and the relative magnetic permeability $\mu_r$ of the susceptor 30. For a given aerosol-producing device, the real-time inductance $L_s$ of the susceptor 30 basically depends on the change of the variable of relative magnetic permeability $\mu_r$.

Further, according to foundations of physics, the relative magnetic permeability $\mu_r$ of the susceptor 30 has a relationship with temperature, for example, physical parameters which can evaluate the relationship, for example, include a temperature coefficient of magnetic permeability $\alpha_\mu$ or magnetic susceptibility $\chi$.

Specifically, the calculation formula for the temperature coefficient of magnetic permeability $\alpha_\mu$ is $\alpha_\mu=(\mu_2-\mu_{r1}/\mu_{r1}(T_2-T_1)$, it is often used for expressing the relative change of the magnetic permeability when the temperature changes in the range of $T_1$ to $T_2$. In the formula, $\mu_{r1}$ is a magnetic permeability at temperature $T_1$, $\mu_{r2}$ is a magnetic permeability at temperature $T_2$.

Another example, the correlation formula for the magnetic susceptibility $\chi$ and the relative magnetic permeability $\mu_r$ of the susceptor 30 is $\mu r=1+\chi$. According to the Curie-Weiss law, the magnetic susceptibility $\chi$ of the susceptor 30 made of a ferromagnetic material has an inverse relationship with temperature, that is, during working, the relative magnetic permeability $\mu_r$ changes under the influence of the temperature of the susceptor 30.

Of course, besides the above main factor of temperature, what is to affect the LC resonance frequency further includes some minor factors, for example, the load change of the entire circuit, the change of the LC frequency selection loop, and the change of parameters of internal relevant elements due to external supply voltage and humidity and the like.

Therefore, in a more preferred embodiment, the circuit 20 further includes: a frequency detection module 23, which is configured to detect an oscillation frequency of the LC oscillator 24; and an MCU controller 22, which is configured to adjust the frequency of the alternating current supplied to the LC oscillator 24 by the DC/AC conversion module 21, according to the oscillation frequency of the LC oscillator 24 detected by the frequency detection module 23; specifically, in one embodiment, the frequency of the alternating current supplied to the LC oscillator 24 is enabled to be the same as or basically close to the oscillation frequency of the LC oscillator 24.

With the aerosol-producing device provided in the above embodiments, the oscillation frequency of the LC oscillator 24 is detected in real time, and the frequency of the power supplied to the LC oscillator 24 is constantly corrected, so that the matching of the frequency is constantly adjusted to adaptively adjust the driving frequency to make the two as close to resonance as possible, thereby reducing power loss.

Further, based on the above preferred implementation of resonance control, in the structure of the circuit 20 in the embodiment of FIG. 3, the DC/AC conversion module 21 is implemented employing a combination of a pulse generator 211 and a half-bridge driver; specifically, the DC/AC conversion module 21 in the preferred embodiment of FIG. 3 further includes:

a pulse generator 211, which is configured to generate a pulse signal with a required frequency; of course, the frequency of the pulse signal is the same as the frequency of the alternating current that the MCU controller 22 controls the DC/AC conversion module 21 to supply to the LC oscillator 24; and a half-bridge driving unit 212, which is configured to supply the DC voltage output from the battery cell 10 to the LC oscillator 24 in a pulse mode, so that the LC oscillator 24 oscillates to form an alternating current passing through the inductance coil L; of course, the frequency of the pulse voltage is the same as the frequency of the pulse signal of the pulse generator 211.

Based on the convenience of acquisition of electronic devices, in a more preferred embodiment, the pulse generator 211 includes a PFM unit 2111 for pulse frequency modulation, wherein the PFM unit 2111 is a relatively optimal pulse modulation mode, for which the frequency of the modulation signal may change with the amplitude of the control signal of the MCU controller 22, but the duty ratio does not change. Therefore, during implementation the frequency of the alternating current output by the half-bridge driving unit 212 can be adjusted according to the frequency of the output modulation signal.

Figure 4:
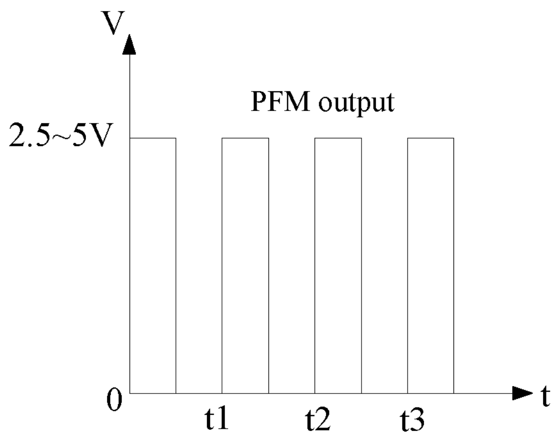
FIG. 4 is a representative waveform of a pulse signal output by a PFM unit shown in FIG. 3.

Further, in the embodiment shown in FIG. 3, at present the signal output by the electronic device of pulse frequency modulation of the PFM unit 2111 generally is a variable low-voltage square wave signal of 2.5V to 5V with a modulated frequency, which can refer to FIG. 4. Based on this situation, the half-bridge driving unit 212 includes a half-bridge subunit 2122 composed of a first transistor Q1 and a second transistor Q2.

Figure 5:
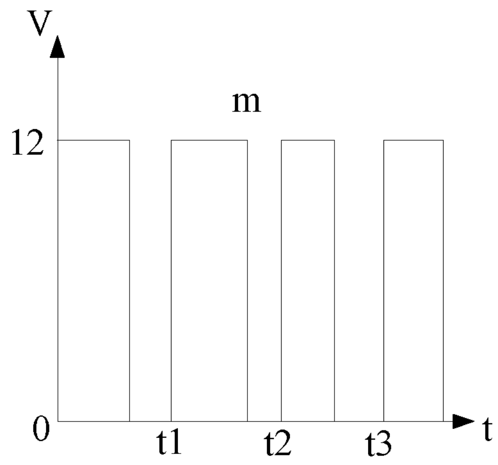
FIG. 5 is a representative waveform of a drive signal output by a half-bridge driver shown in FIG. 3.
Figure 6:
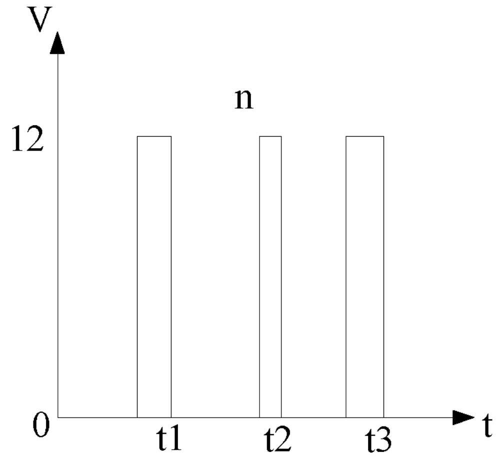
FIG. 6 is a representative waveform of another drive signal output by a half-bridge driver shown in FIG. 3.

Since the square wave signal output by the PFM unit 2111 cannot drive or enable the alternate turn-on of the first transistor Q1 and the second transistor Q2, the half-bridge driving unit 212 further includes:

a half-bridge driver 2121, which, according to a signal output by the PFM unit 2111, is configured to drive the first transistor Q1 and the second transistor Q2 to alternately turn on according to a pulse frequency, thereby enabling the LC oscillator 24 to convert current. Specifically, according to an electronic device available currently, in one implementation the half-bridge driver 2121 configured to drive the half bridge can output two drive signals based on the signal output by the PFM unit 2111, including a first drive signal m shown in FIG. 5 to control the first transistor Q1 to turn on or turn off, and a second drive signal n shown in FIG. 6 to control the second transistor Q2 to turn on or turn off, wherein the first drive signal m and the second drive signal n have a same frequency, and the frequency is equal to the that of the pulse output by the PFM unit 2111; further, according to some industrial standards of electronic devices, a high-level signal output by the half-bridge driver 2121 meeting standards has a voltage value of 12V; the difference between the first drive signal m and the second drive signal n lies in that the time segments of high level are different, when the first drive signal m is a high level, the second drive signal n is a low level; therefore, the time segments of respective high levels are staggered, thereby controlling respectively the first transistor Q1 and the second transistor Q2 to turn on alternately according to a pulse frequency. Thus, the voltage of the battery cell 10 is provided to the LC oscillator 24 according to a pulse frequency, to form inside the LC oscillator 24 a forward process and a reverse process that alternately goes on, thereby converting current and oscillating, so that the inductance coil L works under a sine or cosine alternating current to generate an alternating magnetic field. Specifically, in the embodiment shown in FIG. 3, the forward process includes charging the capacitor C and forming a forward current passing through the inductance coil, and the reverse process includes discharging the capacitor C and forming a reverse current passing through the inductance coil.

Specifically, in an embodiment of FIG. 3, the first transistor Q1 and the transistor Q2 are described taking a N-MOS tube for example; a gate electrode of the first transistor Q1 is connected to a first signal output end of the half-bridge driver 2121 to receive the first drive signal m, a drain electrode is connected to the battery cell 10, and a source electrode is connected to the LC oscillator 24, thereby selectively turning on the drain electrode and the source electrode according to the first drive signal m, and drawing a DC current from the battery cell 10 to output to the LC oscillator 24. A gate electrode of the second transistor Q2 is connected to a second signal output end of half-bridge driver 2121, to receive the second drive signal n; a drain electrode is connected to the LC oscillator 24, and a source electrode is grounded, thereby selectively turning on the drain electrode and the source electrode according to the second drive signal n. As the time segments of high level between the first drive signal m and the second drive signal n are different, the first transistor Q1 and the transistor Q2 in the half-bridge driving unit 212 can turn on alternately, so that the current direction of the LC oscillator 24 changes alternately, thereby forming oscillation.

Of course, the above first transistor Q1 and the second transistor Q2 exampled by N-MOS tube can also be replaced by P-MOS, triode and the like having equivalent functions.

Figure 7:
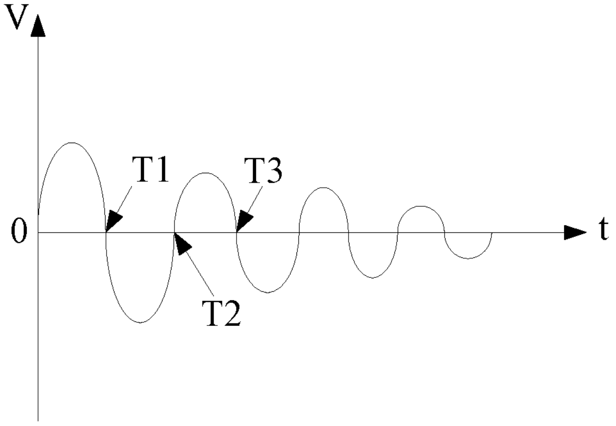
FIG. 7 is a representative oscillation waveform of voltage at point a of an LC oscillator shown in FIG. 3.

The detection of frequency of the LC oscillator 24 may be implemented by detecting the change of voltage or current of the LC oscillator during oscillation. For example, in the embodiment shown in FIG. 3, the frequency detection module 23 employs a voltage detection unit 231 which is configured to detect the voltage value at a detectable position, for example, point a, between the capacitor C and the inductance coil L, thereby obtaining the working frequency of the LC oscillator 24 according to the detected voltage value at the point a. Of course, specifically, in one embodiment, a zero crossing detection circuit of most convenience is taken as the voltage detection unit 231 for exemplary illustration. The zero crossing detection circuit is a common circuit to detect the zero potential of the alternating current when the waveform converts from positive half-cycle to negative half-cycle. The oscillation frequency of the LC oscillator 24 has cyclicity. Of course, as the continuous discharge of the battery cell 10, the quantity of electric charge decreases continuously, the amplitude and frequency of the entire LC oscillator 24 has certain attenuation with time; in one embodiment, the potential of point a presents an oscillation waveform which has cyclicity and has attenuation with time as shown in FIG. 7. In FIG. 4, when the voltage detection unit 231 is implemented employing zero crossing detection, the difference between two adjacent time points T1 and T2 at which the point a has a zero potential is called a half oscillation cycle, then the cycle of the LC oscillator 24 is $T=(T2-T1)\times 2$, and the frequency is $f=1/T$. Then, the MCU controller 22 controls the frequency of the modulation signal output by the PFM unit 212 according to the detected frequency f, thereby making the two frequencies basically tend to be consistent.

Figure 8:
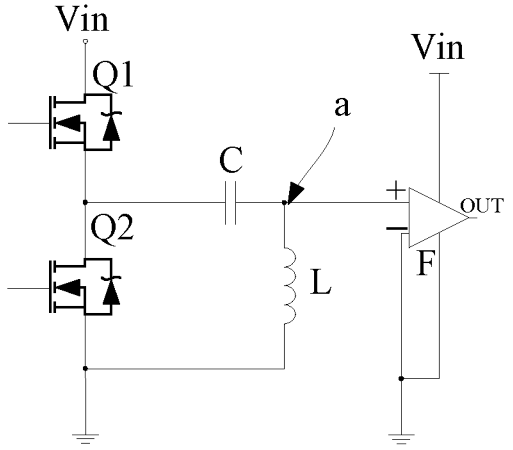
FIG. 8 is a diagram of one embodiment of a voltage detection unit shown in FIG. 3.

For the convenience of complete implementation, the zero crossing detection circuit employed above may be implemented using a universal electronic device of zero crossing comparator, as shown in FIG. 8. In FIG. 8, to install and connect the zero crossing comparator F, a sampling input end "+" is connected to the detectable point a of the LC oscillator 24, and a reference input end "−" is grounded, and a result output end "out" is connected to the MCU controller 22; then, the grounding voltage at the reference input end is when the voltage value received at the sampling input end "+" is 0 too, a signal is output to the MCU controller 22. Thus, frequency detection is realized.

In another preferred embodiment, the first transistor Q1 and the second transistor Q2 are configured to be alternately switched when the zero crossing comparator F detects that the voltage or current of the LC oscillator 24 changes to 0V, which can effectively avoid the heat loss of the first transistor Q1 and the second transistor Q2.

Figure 9:
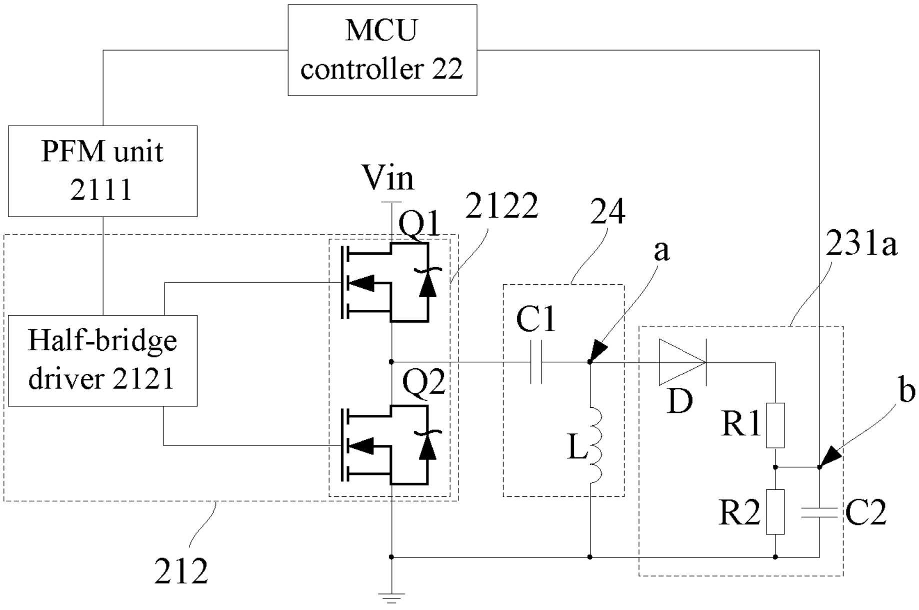
FIG. 9 is a diagram of another embodiment of a voltage detection unit shown in FIG. 3.

In another preferred embodiment, the frequency detection module 23 may be implemented employing an example of another voltage detection unit 231*a* shown in FIG. 9. The voltage detection unit 231*a* includes: a rectifier diode D, a first divider resistor R1 and a second divider resistor R2.

A first end of the rectifier diode D is connected to the point a between the capacitor C1 and the inductance coil L in the LC oscillator 24, and a second end is connected to a first end of the first divider resistor R1.

A second end of the first divider resistor R1 is connected to a first end of the second divider resistor R2.

A second end of the second divider resistor R2 is grounded.

The rectifier diode D filters and rectifies the alternating current of the LC oscillator 24 and then outputs it to a divider circuit composed of the first divider resistor R1 and the second divider resistor R2. Subsequently, the voltage at a point b between the first divider resistor R1 and the second divider resistor R2, that is, the voltage to ground at two ends of the second divider resistor R2, can be received through a sampling pin of the MCU controller 22.

Of course, since the point a outputs an alternating positive-negative current, and the rectifier diode D can only rectify the current within the positive half-cycle or negative half-cycle (in FIG. 9, the direction of the diode takes the positive half-cycle rectification for example), it is a DC voltage with a pulse that is applied to the divider circuit composed of the first divider resistor R1 and the second divider resistor R2 after rectification, then the voltage signal detected at the point b is a pulse signal and the accuracy is affected. Therefore, in order to detect a persistent voltage signal at point b, the voltage detection unit 231*a* further includes a second capacitor C2 in parallel connection with the divider resistor R2. The second capacitor C2 is configured to filter the pulse voltage at two ends of the divider resistor R2 into a DC voltage for the convenience of persistent detection.

Of course, during implementation if the employed MCU controller 22 does not have a voltage detection pin, an ammeter device capable of measuring the voltage at point b can be added between the point b and the MCU controller 22.

Using the above voltage detection unit 231*a*, a sine wave is output from the point a of the LC oscillator 24, and the sine wave, after being rectified, is output to the divider circuit having two divider resistors; a DC sampling voltage of sine wave is obtained at the point b, and the sampling voltage changes with different frequencies of the LC oscillator 24 and is fed back to the MCU. In such way, the MCU can learn the working frequency of the LC oscillator 24 according to the feedback, thereby adjusting the frequency of the pulse output by the PFM unit 2111, and finally ensuring the LC oscillator 24 to be always close to complete resonance.

In another embodiment, the DC/AC conversion module 21 can also be implemented employing a full-bridge driving unit 212*a* in full-bridge driving mode, and the structure includes:

a full bridge 2122*a* composed of four transistors configured to enable the LC oscillator 24 to oscillate, and a full-bridge driver 2121*a* configured to drive the full bridge 2122*a* to alternately turn on so that the LC oscillator 24 converts current.

The signal control of the full-bridge driver 2121*a* is similar to that of the foregoing half-bridge driver 2112, and a drive signal is generated according to a pulse frequency signal output by the PFM unit 2111. With regard to driving the transistor to turn on and off, the first transistor Q1 and the fourth transistor Q4 are synchronous in turn-on or turn-off, while the second transistor Q2 and the third transistor Q3 are synchronous in turn-on or turn-off, which is alternate with the turn-on or turn-off of the first transistor Q1 and the fourth transistor Q4.

Figure 11:
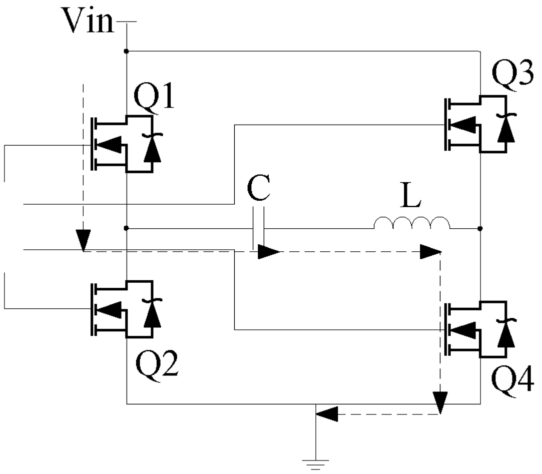
FIG. 11 is a diagram of current of the LC oscillator in FIG. 10 in a turn-on condition.
Figure 12:
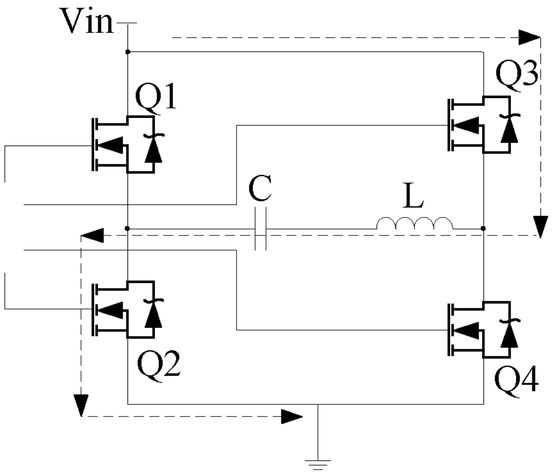
FIG. 12 is a diagram of current of the LC oscillator in FIG. 10 in another turn-on condition.

Therefore, when the first transistor Q1 and the fourth transistor Q4 turn on, the second transistor Q2 and the third transistor Q3 turn off, and the current direction of the LC oscillator 24 is as shown by the arrow in FIG. 11; when the second transistor Q2 and the third transistor Q3 turn on, the first transistor Q1 and the fourth transistor Q4 turn off, and the current direction of the LC oscillator 24 is as shown by the arrow in FIG. 12; therefore, by controlling the alternate turn-on of the full bridge 2122*a*, the current conversion of the LC oscillator 24 can be controlled, so that the LC oscillator 24 oscillates.

Figure 10:
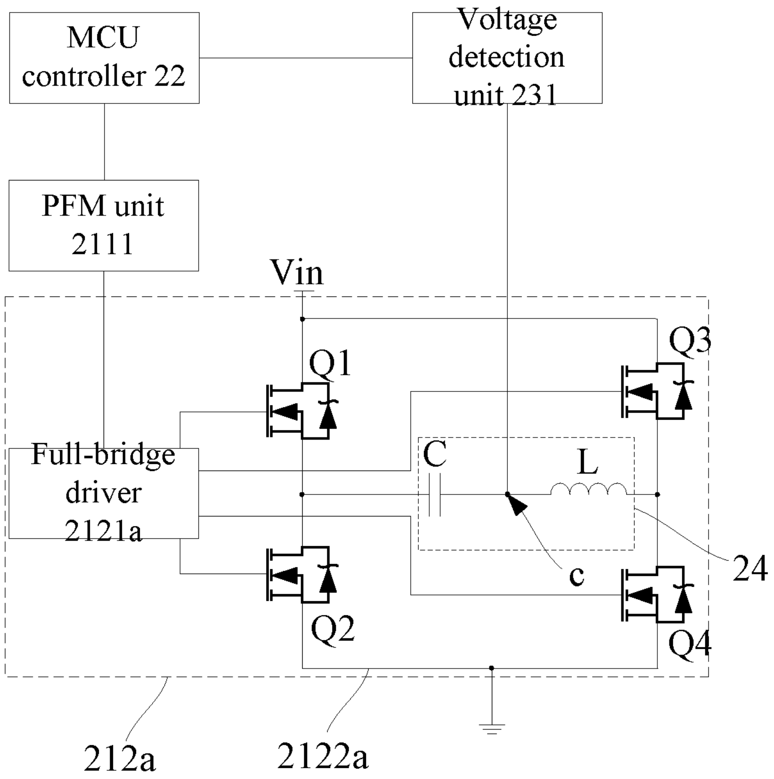
FIG. 10 illustrates another embodiment of a basic element of the circuit shown in FIG. 2.

In the embodiment shown in FIG. 10, the voltage detection unit 231 can detect the voltage at the point c in the LC oscillator 24 shown in FIG. 10 and thus to detect the oscillation frequency. The specific implementation of the voltage detection unit 231 may be the same as the above content.

In other variant embodiments, the above frequency detection module 23 can also obtain the oscillation frequency of the LC oscillator 24 by detecting the change of the magnetic field generated by the inductance coil L; the mechanism lies in the magnetic field generated by the inductance coil L: H=N×I/Le, where N represents the number of windings of the coil, I represents current intensity, Le represents the effective length of the coil. From the formula, the magnetic field generated by the inductance coil L has a relationship with the current in the LC oscillator 24, so that the magnetic field changes with the oscillation of the LC oscillator 24; therefore, the oscillation frequency of the LC oscillator 24 can be determined by detecting the change of the magnetic field. In such type of embodiments, a proper frequency detection module 23, for example, a Hall sensor having Hall effect, is structured and designed to be within the range of magnetic field generated by the inductance coil L; the Hall sensor can generate a sensing signal linearly correlated to the magnetic field intensity according to the change of the magnetic field where it is located, and the MCU controller 22 can obtain the oscillation frequency of the LC oscillator 24 according to the change of the sensing signal.

Or, in other variant embodiments, mutual inductance devices that can respond to the magnetic field generated inside the inductance coil L can also be employed, so that the oscillation frequency of the LC oscillator 24 can be obtained by detecting the change of the magnetic field of the inductance coil L.

It is to be noted that the description of the present disclosure and the drawings just list preferred embodiments of the present disclosure and are not limited to the embodiments described herein. Further, for the ordinary staff in this field, multiple improvements or variations may be made according to the above description, and these improvements or variations are intended to be included within the scope of protection of the claims appended hereinafter.

What is claimed is:

1. An aerosol-producing device, configured to heat a smokable material to generate an aerosol, comprising:

a chamber, which is configured to receive at least part of a smokable material;

an LC oscillator, which comprises a first capacitor and an inductance coil in series connection;

a power supply, which is configured to provide a pulse voltage to the LC oscillator so that the inductance coil of the LC oscillator generates a changing magnetic field;

a susceptor, which is configured to be penetrated by the changing magnetic field to generate heat, thereby heating the smokable material received in the chamber;

a frequency detection module, which is configured to detect an oscillation frequency of the LC oscillator; and a controller, which is configured to adjust the frequency of the pulse voltage provided by the power supply to the LC oscillator, according to a detection result of the frequency detection module:

wherein the aerosol-producing device further comprises a pulse generator, which is configured to generate a pulse signal: wherein the power supply is configured to provide a pulse voltage to the LC oscillator according to a frequency the same as that of the pulse signal: the controller is configured to control the frequency of the pulse signal generated by the pulse generator. according to a detection result of the frequency detection module. thereby adjusting the frequency of the pulse voltage provided by the power supply to the LC oscillator.

2. The aerosol-producing device according to claim 1, wherein the pulse generator is configured to generate the pulse signal through Pulse Frequency Modulation (PFM).

3. The aerosol-producing device according to claim 1, wherein the power supply comprises a Direct Current (DC) battery cell which is configured to provide a DC voltage;

the aerosol-producing device further comprises:

a transistor switch which is configured to allow the DC battery cell to provide voltage to the LC oscillator; and a transistor switch driver, which is configured to control the transistor switch to turn on according to a frequency the same as that of the pulse signal.

4. The aerosol-producing device according to claim 1, wherein the frequency detection module is configured to detect the oscillation frequency of the LC oscillator by monitoring a change of voltage or current of the LC oscillator.

5. The aerosol-producing device according to claim 4, wherein the frequency detection module comprises:

a voltage detection unit, which is configured to detect a voltage value at a detectable position of the LC oscillator; wherein the frequency detection module detects the oscillation frequency of the LC oscillator according to a change cycle of the detected voltage value.

6. The aerosol-producing device according to claim 5, wherein the frequency detection module is configured to detect the oscillation frequency of the LC oscillator according to a time difference between two changes of a voltage value at a detectable position to a threshold.

7. The aerosol-producing device according to claim 6, wherein the threshold is OV;

and/or, the voltage detection unit comprises a zero crossing comparator.

8. The aerosol-producing device according to claim 4, wherein the frequency detection module comprises:

a rectifier diode D, whose input end is connected to a detectable position of the LC oscillator; wherein the frequency detection module further comprises a current detection unit which is configured to detect a current at an output end of the rectifier diode, and the frequency detection module deduces the oscillation frequency of the LC oscillator according to a detection result of the current detection unit.

9. The aerosol-producing device according to claim 8, wherein the current detection unit comprises:

a first divider resistor, a second divider resistor and a second capacitor; wherein a first end of the first divider resistor is connected to the output end of the rectifier diode;

a first end of the second divider resistor is connected to a second end of the first divider resistor, and a second end of the second divider resistor is grounded; and the second capacitor is in parallel connection with the second divider resistor;

wherein the current detection unit is configured to detect the current at the output end of the rectifier diode according to the voltage at two ends of the first divider resistor or the second divider resistor.

10. The aerosol-producing device according to claim 1, wherein the frequency detection module is configured to detect the oscillation frequency of the LC oscillator by monitoring a change of the magnetic field generated by the inductance coil in the LC oscillator.

11. The aerosol-producing device according to claim 10, wherein the frequency detection module comprises a Hall sensor which is configured to sense the magnetic field generated by the inductance coil.

12. The aerosol-producing device according to claim 1, wherein the power supply comprises a Direct Current (DC) battery cell which is configured to provide a DC voltage;

the aerosol-producing device further comprises:

a transistor switch which is configured to allow the DC battery cell to provide voltage to the LC oscillator, wherein the controller adjusts the frequency of the pulse voltage provided by the DC battery cell to the LC oscillator by controlling the frequency of turn-on or turn-off of the transistor switch.

13. The aerosol-producing device according to claim 12, wherein the transistor switch comprises a first transistor and a second transistor; the first transistor and the second transistor are configured to be switched alternately, thereby adjusting the frequency of a forward process and a reverse process of the LC oscillator; wherein the forward process comprises charging the capacitor and forming a forward current passing through the inductance coil; and the reverse process comprises discharging the capacitor and forming a reverse current passing through the inductance coil.

14. The aerosol-producing device according to claim 13, wherein the first transistor and the second transistor are configured to be switched when the voltage of the LC oscillator changes to OV.

15. The aerosol-producing device according to claim 12, wherein the transistor switch comprises a first switch group and a second switch group which are configured to turn on alternately according to a frequency the same as that of the pulse voltage; wherein the first switch group comprises a first transistor and a second transistor;

the second switch group comprises a third transistor and a fourth transistor;

a first end of the first transistor is connected to a voltage output end of the DC battery cell, and a second end of the first transistor is connected to a first end of the LC oscillator;

a first end of the second transistor is connected to a second end of the LC oscillator, and a second end of the second transistor is grounded;

a first end of the third transistor is connected to the voltage output end of the DC battery cell, and a second end of the third transistor is connected to the second end of the LC oscillator; and a first end of the fourth transistor is connected to the first end of the LC oscillator, and a second end of the fourth transistor is grounded.

16. The aerosol-producing device according to claim 1, wherein the frequency of the pulse voltage provided by the power supply to the LC oscillator is ranged from 80 KHz to 400 KHz.

17. The aerosol-producing device according to claim 1, wherein the oscillation frequency of the LC oscillator is ranged from 80 KHz to 400 KHz.

18. An aerosol-producing device, configured to heat a smokable material comprising a susceptor to generate an aerosol, comprising:

a chamber, which is configured to receive at least part of a smokable material;

an LC oscillator, which comprises a first capacitor and an inductance coil in series connection, wherein when at least part of the smokable material is received in the chamber, the inductance coil is inductively coupled with the susceptor of the smokable material;

a power supply, which is configured to provide a pulse voltage to the LC oscillator so that the inductance coil of the LC oscillator generates a changing magnetic field;

a frequency detection module, which is configured to detect an oscillation frequency of the LC oscillator; and a controller, which is configured to adjust the frequency of the pulse voltage provided by the power supply to the LC oscillator, according to a detection result of the frequency detection module:

wherein the aerosol-producing device further comprises a pulse generator, which is configured to generate a pulse signal: wherein the power supply is configured to provide a pulse voltage to the LC oscillator according to a frequency the same as that of the pulse signal; the controller is configured to control the frequency of the pulse signal generated by the pulse generator, according to a detection result of the frequency detection module. thereby adjusting the frequency of the pulse voltage provided by the power supply to the LC oscillator.

19. The aerosol-producing device according to claim 1, wherein the controller adjusts the frequency of the pulse voltage provided by the power supply to the LC oscillator to be the same as or substantially the same as the oscillation frequency of the LC oscillator detected by the frequency detection module.

* * * * *